United States Patent [19]

Astruc et al.

[11] 4,330,387

[45] May 18, 1982

[54] MODIFIED CARBON OR GRAPHITE FIBROUS PERCOLATING POROUS ELECTRODE, AND ELECTROCHEMICAL REACTORS FITTED WITH SUCH AN ELECTRODE

[75] Inventors: Michel Astruc, Pau; Pierre-Yves Guyomar, Ploufragan; Catherine Lestrade, Latresne, all of France

[73] Assignee: Societe Nationale Elf Aquitaine, Paris, France

[21] Appl. No.: 216,925

[22] Filed: Dec. 16, 1980

[30] Foreign Application Priority Data

Dec. 18, 1979 [FR] France ............................. 79 30929

[51] Int. Cl.$^3$ ..................... C25B 9/00; C25B 11/14
[52] U.S. Cl. ............................. 204/275; 204/284; 204/294
[58] Field of Search ............... 204/105 R, 106, 109, 204/112, 114, 130, 153, 149, 275, 294, 284, 282, 286

[56] References Cited

U.S. PATENT DOCUMENTS

| | | | |
|---|---|---|---|
| 3,459,652 | 8/1969 | Grangaard | 204/294 |
| 3,650,925 | 3/1972 | Carlson | 204/284 X |
| 3,658,685 | 4/1972 | Childs et al. | 204/294 X |
| 3,784,456 | 1/1974 | Otto | 204/130 X |
| 3,953,313 | 4/1976 | Levenson | 204/284 X |
| 3,968,273 | 7/1976 | Kastening et al. | 204/294 X |
| 4,130,473 | 12/1978 | Eddleman | 204/294 X |
| 4,188,279 | 2/1980 | Yan | 204/294 |
| 4,244,793 | 1/1981 | Johnson et al. | 204/294 X |
| 4,265,727 | 5/1981 | Beckley | 204/294 X |
| 4,269,674 | 5/1981 | Osa et al. | 204/294 X |

Primary Examiner—J. M. Tufariello
Attorney, Agent, or Firm—Burgess, Ryan and Wayne

[57] ABSTRACT

This invention concerns a fibrous percolating porous electrode of the type containing a fibrous porous matrix made of carbon or graphite.

The fibrous porous matrix, such as a carbon or graphite felt, is modified, for example by impregnation with a surface-active agent, and in the wetted state its apparent density in relation to water possesses specific values.

7 Claims, No Drawings

MODIFIED CARBON OR GRAPHITE FIBROUS PERCOLATING POROUS ELECTRODE, AND ELECTROCHEMICAL REACTORS FITTED WITH SUCH AN ELECTRODE

This invention concerns a modified carbon or graphite fibrous percolating porous electrode. It also concerns the use of such an electrode in electrochemical reactions, more specifically electrodeposition of metals present in the form of ions in various industrial liquids. Finally, it conerns electrochemical reactors with percolating porous electrodes, in which these electrodes are of the said modified fibrous percolating porous type.

Treatment of industrial aqueous waste containing small concentrations of metals, particularly heavy metals, in the form of ions, in order to extract such metals before discharging the waste into the natural environment, has become increasingly necessary, partly because of the danger for flora and fauna from certain metal ions, and partly because of the constantly rising cost of such metals.

There are many suggested methods of treating aqueous industrial effluent in order to recover any small amounts of heavy metals they may contain in the form of ions; such methods include electrolytic processes using electrodes with high specific surface-area, known as percolating porous electrodes. These electrodes take the form of a porous matrix made from a conducting material, or a mixture of a conducting material and a non-conducting material. In the course of electrolytic treatment of an effluent containing the metal ions to be removed, the percolating porous electrode is placed in opposition to a counter-electrode, and the effluent, which acts as the electrolyte, percolates through the porous electrode. The electrochemical reaction, in this case reduction of the metal ions to metal, resulting from the potential difference between the porous electrode matrix and the solution, related to the potential difference between the percolating porous electrode and the counter-electrode, takes place actually inside the percolating porous electrode.

The different types of percolating porous electrodes described in the literature comprise electrodes with a fibrous carbon or graphite structure. These combine the advantages of percolating porous electrodes with a much lower cost than similar electrodes with a non-fibrous structure. Existing fibrous percolating porous electrodes made of carbon or graphite consist, for example, of specifically arranged carbon fibres (cf. U.S. Pat. No. 4,046,663) or of a graphite cloth (cf. D. Yaniv and M. Ariel: "Electrodeposition and stripping at graphite cloths electrodes", Journal of Electroanalytical Chemistry 79, 1977, pp. 159 to 167).

The drawbacks of fibrous carbon or graphite percolating porous electrodes are that the results they provide cannot be reproduced accurately enough, and yields are usually low.

This invention concerns a modified carbon or graphite fibrous percolating porous electrode which overcomes these disadvantages, while remaining comparable in cost with a corresponding unmodified percolating porous electrode.

This new fibrous percolating porous electrode comprises a fibrous carbon or graphite porous matrix, and is characterized by the fact that the matrix is modified, presenting an apparent density in the wetted state in relation to water of between 1.6 and 3 times the apparent density in relation to water of the corresponding non-modified fibrous porous matrix in the wetted state.

The modified carbon or graphite fibrous porous matrix of the fibrous percolating porous electrode preferably presents an apparent density in relation to water, in the wetted state, of between 1.8 and 2.7 times the apparent density in relation to water of the corresponding non-modified fibrous porous matrix in the wetted state.

In this description and the accompanying claims, the apparent density in relation to water of the fibrous porous matrix in the wetted state refers to the ratio of the weight of a certain volume of the fibrous porous matrix, after submersion in water for a period of time $\Delta$ between 1 and 2 minutes, to the weight of the same value of water.

This apparent density $\delta$ is established after weighing by means of the equation $$\delta = \frac{M_3 - M_1}{\frac{D}{d} \times M_2} + 1$$

where
- $M_1$ is the weight in grams of a container of volume V filled with water;
- $M_2$ is the weight in grams of a volume v of dry fibrous porous matrix;
- $M_3$ is the weight in grams of the container holding the volume v of matrix and enough water to occupy the full volume V;
- D is the density of water;
- d is the density of the dry porous matrix.

If $\delta_M$ and $\delta_O$ are the apparent densities in relation to water of the wetted modified fibrous porous matrix and the wetted unmodified fibrous porous matrix, established by the process of calculation described above, the ratio of $\delta_M$ to $\delta_O$ for this new electrode is between 1.6 and 3, and preferably between 1.8 and 2.7.

The modified carbon or graphite fibrous porous matrix of this new percolating porous electrode may, for example, be a fibrous porous matrix of carbon or graphite which has been subjected to a vacuum of varying force, in order to confer on it those properties that will produce the appropriate value for the apparent density $\delta$.

In one recommended embodiment of the invention, the modified fibrous porous matrix with an apparent density lying within the limits specified above consists of a fibrous porous matrix of carbon or graphite impregnated with a surface-active agent.

By "surface-active agent" or "surfactant", is meant a single agent or a mixture of said agents.

The technique by which the fibrous matrix is impregnated with surfactant is not of critical importance. For example, the fibrous porous matrix may be submerged in an aqueous solution containing a suitable concentration of surfactant, or sprayed with such a solution, any excess surfactant being removed by fast washing of the impregnated matrix, and the impregnated matrix dried if necessary. The concentration of surfactant in the aqueous solution used for impregnating the porous fibrous matrix is usually between 0.01 and 1% of the weight of the solution. Aqueous surfactant solutions containing more than 1% weight of such an agent do not provide any better result, and the quantity of surfactant consequently deposited in the fibrous porous matrix even causes inconvenient foaming when the modified percolating porous electrode is placed in contact with effluent to be treated electrochemically.

Suitable surface-active agents for use in impregnating the fibrous matrix of percolating porous electrodes comprise anionic, cationic, non-ionic or even amphoteric surfactants. Anionic surfactants comprise sulphated glycerides, sulphated esters, for example, sulphated alcoyl oleates such as sulphated butyl oleate, sulphated long-chain olefins, saturated or unsaturated fatty acid sulphates, for example sodium lauryl sulphate, sodium cetyl sulphate, sodium 2-ethyl hexyl sulphate, oleic alcohol sodium sulphate, alkane sulphonates of alkaline metals, more specifically sodium alkane sulphonates, sulphosuccinates, alkylaryl sulphonates of alkaline metals, more specifically sodium alkylnaphthalene sulphonates and sodium alkylbenzene sulphonates, such as sodium butylnaphthalene sulphonate and sodium xylene sulphonate. Cationic surfactants comprise fatty amine hydrochlorides, or quaternary ammonium chlorides of long-chain amines, such as lauryltrimethyl ammonium chloride or laurylpyridinium chloride. Non-ionic surfactants comprise addition products of ethylene oxide and alcohols or phenols, and more specifically polyoxyethylene ethers of higher fatty acids and polyoxyethylene ethers of alkyl phenols, or fatty acid esters of polyoxyalkylene glycols, particularly fatty acid esters of polyoxyethylene glycols. Amphoteric surfactants comprise amine-acids and betaines containing long-chain alkyl radicals, or unsaturated or hydroxylated fatty acid sulphates, such as sulphated oleylamine or sulphated hydroxyoctadecylamine.

The surface-active agent used to impregnate the fibrous matrix preferably has an HLB number (hydrophile-lipophile balance) of between 5 and 20, and more specifically between 10 and 16.

The carbon or graphite fibrous porous matrix from which the modified fibrous porous matrix of this new percolating porous electrode is prepared, for example by impregnation with a surface-active agent, may consist of any fibrous carbon or graphite structure which is sufficiently porous to allow a solution to percolate through it under the conditions normally prevailing for percolating porous electrodes. Such a fibrous porous matrix may consist, for example, of a carbon fibre structure, such as described in U.S. Pat. No. 4,046,663, or of a woven or non-woven carbon or graphite cloth, or of carbon or graphite fibre flock, and is preferably a carbon or graphite felt.

The modified percolating porous electrodes in this new electrode may take the form of a sheet or a plate or disc, or be ring-shaped, or of any other suitable shape.

This new modified percolating porous electrode is particularly used to perform electrochemical reactions, more specifically electrochemical reactions in the aqueous phase, by employing the process in which a solution containing the product or products liable to electrochemical reaction is made to percolate through a porous electrode, this solution being traversed by an electrical current resulting from the establishment of a potential difference between the percolating porous electrode and a counter-electrode, which may also be a percolating porous electrode, in contact with the said solution.

Such a process, using this new percolating porous electrode, may be used in particular in electrodeposition reactions to extract metals such as copper, lead, silver, gold, mercury, cadmium or nickel, contained in varying concentrations in the form of ions in various solutions, for example in low concentrations in industrial effluent or in higher concentrations in hydrometallurgical treatment solutions. The same process may also be used to destroy certain organic polluting agents, or anions such as cyanide ions, contained in waste water from certain treatment processes, or even to synthesize organic products involving one or more electrochemical reactions.

Suitable electrochemical cells or reactors for these new electrochemical reactions contain fixed percolating porous electrodes known in the previous art, except that in this case the electrode is the new modified percolating porous electrode described in this invention. Such electrochemical cells or reactors usually comprise a container with an inlet and outlet for the solution to be treated, a fixed percolating porous electrode installed in this container near the inlet, so that the liquid reaching the inlet enters the container only by percolating through the electrode, a counter-electrode installed in the container, between the percolating porous electrode and the container outlet, means of setting up a potential difference between these electrodes, and means of making the solution circulate between the container inlet and outlet.

In the electrochemical cells or reactors, the percolating porous electrode and the counter-electrode, which may also be a percolating porous electrode, may be positioned in such a way that the current lines in the solution between them are parallel to the direction of flow of the solution, or in such a way that the current lines are approximately perpendicular to the direction of flow of the solution. For example, such electrochemical cells or reactors may be similar to those shown in U.S. Pat. No. 4,046,663, or in the article by G. A. Carlson and E. E. Estep entitled "Porous cathode cell for metals removal from aqueous solutions", published in Electrochemical Contributions to Environmental Protection, 1972, pp. 159 to 167, or in the article by G. A. Carlson, E. E. Estep and D. Jacqueau entitled "Porous cathode cell for sodium hydroxide purification", published in the journal Chemie-Ingenieur-Technik, 1973, 45 (4) pp. 217 to 219.

When this process is applied to solutions containing products which, after electrochemical reaction, are converted into solids, such as metal ions reduced to metal, and are deposited on the surface of the percolating porous electrode, and possibly also inside it, the efficiency of the electrode is decreased by clogging. It is possible to regenerate the clogged percolating porous electrode, in other words remove the solids deposited on and inside it, and recover these deposits. This may be done mechanically, the deposit being recovered in the form of a solid, or chemically or electrochemically, the solid deposit being redissolved and recovered in a concentrated ionic solution. Mechanical methods are suitable when the solid deposit, such as a metallic deposit, is to be found on the surface of the percolating electrode. It is done, for example, by detaching the deposit, particularly metal, by gravity, with the liquid supply to the cell or reactor being halted, or by scrapping the surface of the electrode, continuously or intermittently. Chemical regeneration consists of placing the clogged percolating porous electrode in contact with a minimum volume of a suitable reagent, which dissolves the solid deposited in the electrode, producing a concentrated solution of the dissolved product in the reagent. For example, when copper is deposited in the percolating porous electrode, the clogged electrodes can be regenerated by submerging it in a minimum volume of an aqueous acid solution, the copper being receovered in the form of an aqueous copper nitrate solution, which is much more concentrated than the effluent treated in the electrochemical cell or reactor. For electrochemical regeneration of a clogged percolating porous electrode, the deposit is redissolved electrochemically, by reversing the functions of the percolating porous electrode and counter-electrode. Where the deposit is metallic, redissolving corresponds to electrochemical oxidation of the metallic deposit, by making the clogged percolating porous electrode act as anode and the counter-electrode as cathode. In the case of electrochemical regeneration of a clogged percolating porous electrode, the electrochemical reaction producing the solid deposited on and/or inside the electrode is preferably performed in an electrochemical cell or reactor comprising a container with an inlet in the middle portion and two outlets on each side of this inlet, one fixed percolating porous electrode installed in the container between the inlet and one of the outlets, and another fixed percolating porous electrode installed between the inlet and the other outlet, both these percolating porous electrodes being positioned in the container in such a way that the solution to be treated, which circulates inside the container between the inlet and each of the outlets, percolates through each of the two electrodes, means of setting up a potential difference between the electrodes, one of these electrodes functioning as anode and the other as cathode, and means of supplying the solution to the container and causing it to circulate between the container inlet and outlets. Such an apparatus is similar to the one shown diagrammatically in the article by D. N. Bennion and J. Newman entitled "Electrochemical removal of copper ions from very dilute solutions", published in the Journal of Applied Electrochemistry 2 (1972), pp. 113 to 122, except that the new modified percolating porous electrodes are used. When a dilute solution of metal ions, for example, is treated, the metal is deposited inside the percolating porous electrode, which acts as cathode, and this electrode is regenerated by changing the polarities of the electrodes, and thereby reversing their functions.

In the case of solutions containing ions of different metals with sufficiently differently electrodeposition potentials, selective recovery of the metals is possible, by using a series of electrochemical cells or reactors fitted with these new percolating porous electrodes, each cell or reactor operating under suitable conditions to cause deposit of a single metal on the cathode, and the order in which the metals are deposited corresponding to the increasing level of their electrodeposition potentials.

In electrochemical reactions, such as electrodeposition of metals contained in small concentrations, for example 1 to 1000 ppm, or in higher concentrations, in the form of metal ions, and more specifically heavy metal ions, or destruction of organic polluting agents or cyanide ions contained in waste water, or electro-organic synthesis, using electrochemical cells or reactors equipped with these new modified percolating porous electrodes, operating conditions such as the potential to be established in the percolating porous electrode, the potential difference between the electrodes in the electrochemical cell or reactors, or the speed of flow of the solution through the percolating porous electrode, can be determined in each case by someone skilled in the art, on the basis of the properties of the solutions to be treated, and electro-chemical data known in the literature, or experimentally, on the basis of the electrochemical reaction to be performed, and the characteristics of the electrochemical cell or reactor used and the percolating porous electrode installed in the cell or reactor. For instance, the potential required in the percolating porous electrode or the potential difference between the cell or reactor electrodes can be established from an experimental intensity/potential graph for the reaction concerned, in the appropriate reactor, or a reactor with the same geometrical features, with the relevant solution. The potential required in the percolating porous electrode usually corresponds to a potential selected on the extreme diffusion current level, and the potential difference between the cell or reactor electrodes is related to this value, also allowing for ohmic drop in the solution between the electrodes. The rate of flow of the solution through the cell or reactor is selected so as to ensure adequate efficiency in the electrochemical reaction, while avoiding undesirable phenomena such as clogging of the percolating porous electrode, where the electrochemical reaction results in a solid deposit on and/or in the percolating porous electrode. These procedural conditions correspond approximately to those used in performing the same reaction in an electrochemical cell or reactor similar to the one specified here, but equipped with an unmodified percolating porous electrode.

The invention is illustrated by the following examples without in any way being confined to them.

EXAMPLE 1

A disc of commercial carbon felt, 4 mm thick, was impregnated with an alcoyl sulphate-based surface-active agent, sold commercially under the brand name "Teepol" and with an HLB number between 13 and 15.

The carbon felt was made up of fibres approximately $10\mu$ in diameter, with the following properties:

carbon content: 94 to 97% weight
ash content: 0.1 to 0.3% weight
volatile matter content: 1.5 to 4% weight
sulphur content: 0.3 to 0.5% weight
resistance to oxidation (weight loss after 48 hrs in air at 350° C.): 4 to 12%
specific surface-area: 0.5 to 1 m$^2$/g
apparent density in relation to water, in wetted state: 0.401

The disc was impregnated by submerging it in 0.1% aqueous solution of surface-active agent, then rinsing it quickly in distilled water and leaving it to drain.

The apparent density $\delta_M$ of the surfactant-impregnated disc in the wetted state in relation to water was 1.03, and the ratio of this value $\delta_M$ to the apparent density $\delta_O$ of the non-impregnated disc in the wetted state was 2.56.

An aqueous solution containing 500 ppm copper ions and 0.5 moles potassium sulphate was treated in an electrolysis cell equipped with a percolating porous electrode containing the fibrous porous matrix modified by impregnation as described above, namely the surfactant-impregnated felt disc, in order to extract the copper by electrodeposition.

The electrolysis cell consisted of a vertical cylindrical container closed at each end, with an inlet at the bottom for the solution to be treated and an outlet at the top for the purified solution. The percolating porous electrode, consisting of the surfactant-impregnated felt disc carried on a plastic base which also contained a platinum ring to supply current, in contact with the disc, was positioned inside the container, near the bottom, in such a way as to separate the container into a lower compartment near the inlet and an upper compartment near the outlet. The percolating porous electrode acted as cathode. The upper compartment contained a platinum electrode, and a saline bridge of potassium nitrate connected the cell to a calomel reference electrode. Each electrode was connected to a potential gauge, which produced a given level of d.c. voltage in the cathode and anode. A millivoltmeter was used to measure the potential difference between the cathode and the reference electrode, and a milliammeter was fitted in series with the anode on the circuit connecting the anode with the potential gauge. The cell inlet was connected by a peristaltic pump to a tank containing the solution to be treated.

For this reaction to reduce copper ions to metal, the cathode was given an electrolysis potential of $-300$ millivolts compared with the reference electrode, this value being established on the experimental intensity/potential graph for the solution involved, and representing the average potential of the potential interval according to the level of the graph defining the extreme diffusion current. The copper ion in solution was injected into the cell through the peristaltic pump in such a way as to percolate through the percolating porous electrode and circulate inside the container at a uniform velocity of $5.5 \times 10^{-5}$ meters per second.

The instantaneous efficiency R of removal of copper from the solution was worked out in relation to time, R being defined by the equation:

$$R \% = \frac{C_O - C_L}{C_O} \times 100$$

where $C_O$ is the concentration of metal ions in the solution at the cell inlet and $C_L$ is the same concentration at the outlet.

Table I shows the results of this calculation.

TABLE I

| | Hours | | | | | | | |
|---|---|---|---|---|---|---|---|---|
| | 1 | 2 | 3 | 4 | 12 | 15 | 20 | 29 |
| R % | 97.5 | 95 | 81 | 68 | 57 | 54 | 51 | 50.5 |

Ion-elimination efficiency was high during the first two hours (approximately 95%), then descreased in a more or less linear manner, stabilizing after the twentieth hour at around 50-51%.

When the same copper ion solution was treated by the same process, but using a percolating porous electrode with a fibrous porous matrix consisting of non-impregnated felt, initial elimination efficiency was 30%, much less than the levels obtained with the impregnated matrix, even after a long period of operation.

EXAMPLE 2

The procedure described in Example 1 was repeated, using the new modified percolating porous electrode, but changing the peristaltic pump operation to produce a velocity of circulation of solution in the reaction cell of $1.98 \times 10^{-4}$ meters per second.

Table II shows elimination efficiency in relation to reaction time:

TABLE II

| | Hours | | | | | | | |
|---|---|---|---|---|---|---|---|---|
| | 0.5 | 1.5 | 2.5 | 4 | 7 | 8.5 | 12 | 15 |
| R % | 97.5 | 91 | 88.5 | 82 | 56.5 | 50 | 45 | 45 |

Ion-elimination efficiency was high at the beginning of the reaction, then decreased in a more or less linear manner, stabilizing after the twelfth hour at around 45%.

When the same copper ion solution was treated under the same conditions, but using a percolating porous electrode with a fibrous porous matrix consisting of non-impregnated felt, initial elimination efficiency was 33%, much less than the levels obtained with the impregnated matrix, even after a long period of reaction.

EXAMPLE 3

An aqueous solution containing 1,000 ppm silver ions and 0.5 moles potassium sulphate was treated in order to extract the silver by electrodeposition.

This was done in an electrolysis cell with a percolating porous electrode similar to the cell described in Example 1. In particular, the fibrous porous matrix of the percolating porous electrode consisted of a similar felt disc 4 mm thick, similarly impregnated with an aqueous surface-active solution. The surfactant-impregnated felt disc had an apparent density $\delta_M$ in the wetted state in relation to water of 1.02, and the ratio of this value $\delta_M$ to the apparent density $\delta_O$ of the non-impregnated disc in the wetted state was 2.54.

For this reaction to reduce silver ions electrochemically to metal, the cathode was given an electrolysis potential of $-100$ millivolts compared with the reference electrode. The silver ion solution was injected into the cell through the peristaltic pump in such a way as to percolate through the porous electrode and circulate inside the container at a uniform velocity of $1.98 \times 10^{-4}$ meters per second.

After four hours' reaction, elimination efficiency was 88.4%, and it was still 86.6% after 14 hours.

EXAMPLE 4

An aqueous solution containing 1,000 ppm lead ions ($Pb^{++}$) and 0.5 moles potassium nitrate was treated in order to extract the lead by electrodeposition.

This was done in an electrolysis cell with a percolating porous electrode similar to the cell described in Example 3.

For this reaction to reduce lead ions to metal, the cathode was given an electroysis potential of $-700$ millivolts compared with the reference electrode. The lead ion solution was injected through the peristaltic pump in such a way as to circulate inside the container at a velocity of $1.98 \times 10^{-4}$ meters per second.

After 90 minutes reaction, lead elimination efficiency was still 68.4%.

EXAMPLE 5

An aqueous solution containing 2.5 ppm cadmium and 5 ppm nickel ions was treated in order to extract cadmium and nickel by electrodeposition.

This aqueous solution was the floating surface layer of an industrial aqueous effluent from a setting tank, with a pH-value of between 8.5 and 9.

The reaction was performed in an electrolysis cell with a percolating porous electrode similar to the cell described in Example 3.

A potential difference of −2.3 volts was established between anode and cathode, and the peristaltic pump was regulated so that the solution to be treated circulated inside the container at a velocity of $1.84 \times 10^{-4}$ meters per second.

The treated effluent leaving the cell contained 0.05 ppm cadmium and 0.7 ppm nickel.

Ion-elimination efficiency was 98% for cadmium and 86% for nickel at the start of reaction, and these levels were maintained after 24 hours' reaction.

EXAMPLE 6

Commercial carbon felt discs with the same properties as those specified in Example 1, but 10 mm thick, were impregnated with the same surface-active agent as in Example 1, in an aqueous solution of variable concentration.

Impregnation was done by submerging the felt discs in the appropriate surfactant solution, then rinsing them quickly in distilled water and leaving them to drain.

Table III shows the apparent density $\delta_M$ for each impregnated disc in the wetted state, and the ratio $\delta_M$ to the apparent density $\delta_O$ of the non-impregnated disc in the wetted state, in relation to the surfactant concentration of the aqueous solution used for impregnation.

TABLE III

| Test n° | C* | $\delta_M$ | $\delta_M/\delta_O$ |
|---|---|---|---|
| I | 0.01 | 0.78 | 1.95 |
| II | 0.05 | 0.838 | 2.09 |
| III | 0.06 | 0.906 | 2.26 |
| IV | 0.08 | 0.99 | 2.47 |
| V | 0.1 | 1.03 | 2.56 |

C* = percentage weight of surfactant in the aqueous solution used for impregnation.

A solution containing 1,000 ppm copper ions and 0.5 moles potassium sulphate was treated in an electrolysis cell equipped with a percolating porous electrode similar to the cell described in Example 1, in which the fibrous porous matrix of the percolating porous electrode consisted of one of the surfactant-impregnated discs described above, in order to extract the copper by electrodeposition.

For this reaction to reduce copper ions to metal, the cathode was given an electrolysis potential of −300 millivolts compared with the reference electrode, and the peristaltic pump was regulated so that the solution to be treated circulated inside the container at a velocity of $1.98 \times 10^{-4}$ meters per second.

Table IV shows the initial elimination efficiency $R_M$ for each impregnated fibrous porous matrix.

TABLE IV

| | Impregnated matrix | |
|---|---|---|
| Test n° | $\delta_M/\delta_O$ | $R_M$ (%) |
| I | 1.95 | 92 |
| II | 2.09 | 95 |
| III | 2.26 | 96.5 |
| IV | 2.47 | 97.5 |
| V | 2.56 | 97.5 |

Using the same procedure, but with a percolating porous electrode containing a matrix of non-impregnated carbon felt, initial efficiency was only 33%.

EXAMPLE 7

A commercial felt disc, 3.5 mm thick, was impregnated with an aqueous solution containing 0.1% weight of the surfactant-active agent used in Example 1, in the same way as described in Example 1, said felt being a graphite felt.

The graphite felt was made up of fibres approximately $9\mu$ in diameter, with the following properties:

carbon content: >99%
ash content: <0.1%
volatile matter content: <1%
sulfur: <0.1%
resistance to oxidation (weight loss after 48 hrs in air at 350° C.): <1%
apparent density in relation to water, in wetted state ($\delta_O$): 0.412

The apparent density $\delta_M$ of the surfactant-impregnated disc in the wetted state in relation to water was 1.03, and the ration of $\delta_M$ to $\delta_O$ was 2.5.

An aqueous solution containing 1,000 ppm copper ions and 0.5 moles potassium sulphate was treated in an electrolysis cell equipped with a percolating porous electrode, similar to the cell described in Example 1, in which the fibrous porous matrix of the percolating porous electrode consisted of the surfactant-impregnated graphite felt disc, in order to extract the copper by electrodeposition.

The cathode was given an electrolysis potential of −300 millivolts compared with the reference electrode, and the peristaltic pump was regulated so that the solution to be treated circulated inside the container at a velocity of $1.98 \times 10^{-4}$ meters per second.

The initial ion-elimination efficiency was 99.3%. Under stationary operating conditions, it was also found that, all other conditions being equal, the ion-elimination efficiency with an impregnated graphite felt in the percolating porous electrode was higher than that obtained with a percolating porous electrode in which the matrix consisting of a surfactant-impregnated carbon felt disc. However, the electrode with a surfactant-impregnated graphite felt matrix clogged up more quickly than a percolating porous electrode with a surfactant-impregnated carbon felt matrix.

EXAMPLE 8

An aqueous effluent resulting from analysis of the chemical oxygen demand (COD) of water, and containing 1,700 ppm weight of mercury ions ($Hg^{++}$) and 850 ppm silver ions ($Ag^+$), was treated in order to extract the mercury and silver by electrodeposition.

Analysis of the COD of water (determination of content of oxidizable matter) consists in general of oxidizing such substances by means of an excess of potassium dichromate, in an acid medium at boiling point, in the presence of silver sulphate as oxidation catalyst, and mercury sulphate as the chloride complexing agent, then measuring the excess potassium dichromate by means of a titrated solution of divalent iron sulphate and ammonium.

This COD effluent was treated in an electrolysis cell consisting of a vertical cylindrical container closed at each end, with an effluent inlet at the bottom and two effluent outlets on the sides. A cylindrical cathode in the form of a porous cylindrical sleeve divided the container into a central zone, into which the inlet opened, and an outer zone communicating with the outlets in the side of the container. This separation into two zones by the cathode meant that the liquid entering the central zone through the container inlet percolated through the porous cathode into the outer zone, and from there through the outlets. The central zone contained an anode, inside and concentric with the cylindrical cathode. The cathode and anode each consisted of a modified carbon felt matrix mounted on a base also containing means of supplying the felt with electric current. The modified matrix consisted of carbon felt with the same properties as the carbon felt described in Example 1, impregnated with the same surface-active agent and using the same procedure for impregnation as in Example 1. The apparent density $\delta_M$ of the surfactant-impregnated carbon felt matrix in the wetted state, in relation to water, was 1.03, and the ratio of this density $\delta_M$ to the apparent density $\delta_O$ of non-impregnated felt in the wetted state in relation to water was 2.56.

A potential difference of $-2.4$ volts was established between the electrodes, and the effluent flow entering the cell was regulated so that it circulated inside the container at a velocity of $1.31 \times 10^{-5}$ meters per second.

The initial ion-elimination efficiency was 99% for silver and 98% for mercury.

EXAMPLE 9

An aqueous solution containing 1.000 ppm copper ions and 0.5 moles potassium sulphate was treated in an electrolysis cell similar to the cell described in Example 3, until a copper deposit weighing approximately 8 grams was obtained in the cathode. Admission of the solution was then halted.

The electrode polarities were reversed, and a potential difference between the anode and cathode of 500 millivolts was established. An aqueous solution containing 0.5 moles potassium sulphate, with the pH-value adjusted to 1 by adding sulphuric acid, was made to circulate inside the container, in the opposite direction to the original flow of solution to be treated, at a velocity of $2.8 \times 10^{-5}$ meters per second. This oxidized the copper deposit into copper ions, which entered the solution circulating inside the container, thereby resulting in electrochemical regeneration of the electrode containing the deposits. After 30 minutes, part of the copper deposited on the electrode had been dissolved, and the solution leaving the cell contained 7,000 ppm copper ions.

EXAMPLE 10

Para-aminophenol was synthesized by electroreduction of paranitrophenol, using an electrochemical cell containing one of these new percolating porous electrodes.

The cell comprised a vertical cylindrical container closed at each end, with an inlet at the bottom and an outlet at the top. A percolating porous cathode, consisting of a modified fibrous porous matrix resting on a platinum ring which supplied electric current, was located near the bottom of the container, dividing it into a lower zone communicating with the inlet and an upper zone communicating with the outlet, so that the reaction mixture, forced into the container through the inlet, percolated through the cathode into the upper zone, and from there out through the outlet. The modified fibrous porous matrix of the cathode consisted of a carbon felt disc impregnated with a surface-active agent with the same properties as the impregnated disc used in test IV in Example 6. A saline bridge, consisting of a capillary tube filled with $KNO_3$-saturated gelatine, connected the upper container zone with a saturated calomel electrode, acting as a referee electrode, and an anode consisting of a perforated platinum disc through which the reaction mixture could pass, and which allowed the saline bridge element inside the container to be installed, was located above the cathode, in a cross-sectional view of the container. The electrodes were connected to a potential gauge, and a milliammeter was mounted in series on the anode circuit, between the anode and the potential gauge, while a millivoltmeter was mounted in parallel between the reference electrode and the cathode. The reaction mixture was forced in through the cell inlet by a peristaltic pump.

The reaction mixture consisted of an aqueous solution containing 10% weight of ethanol and $5 \times 10^{-3}$ moles of paranitrophenol, and 0.3 moles of potassium hydrogenophthalate as electrolyte. Soda was added to adjust the pH-value of this solution to 4.8.

A potential of $-820$ millivolts compared with the reference electrode was established in the cathode. This value was determined by the experimental intensity/potential graph for paranitrophenol, and corresponded approximately to the average potential interval for the diffusion level. The reaction mixture was then injected into the container at a uniform flow-rate of 35.4 milliliters per hour.

The paranitrophenol conversion yield R, as defined by the equation $$R \% = \frac{C_O - C_L}{C_O} \times 100$$

where $C_O$ is the paranitrophenol concentration in the mixture entering the cell and $C_L$ the concentration in the mixture leaving the cell, was 97% at the beginning of the reaction, and it remained at this level throughout the test.

What is claimed is:

1. A fibrous percolating porous electrode comprising a fibrous carbon or graphite porous matrix impregnated with a surface active agent having an apparent density in relation to water, in the wetted state, between 1.6 and 3 times the apparent density in relation to water of the corresponding non-impregnated fibrous porous matrix in the wetted state.

2. An electrode according to claim 1, wherein the apparent density of the impregnated matrix in relation to water, in the wetted state, is between 1.8 and 2.7 times the apparent density in relation to water of the corresponding non-modified matrix in the wetted state.

3. An electrode according to claim 1, wherein the HLB number of the surface-active agent used to impregnate the modified matrix is between 5 and 20.

4. An electrode according to claim 3, wherein the HLB number is comprised between 10 and 16.

5. An electrode according to claim 1, in which the fibrous porous matrix is made from carbon or graphite felt.

6. An electrochemical reactor comprising one or more percolating porous electrodes at least one of said percolating porous electrodes is the electrode of claim 1 and a counter-electrode.

7. A reactor of claim 6 comprising a cell with an inlet and an outlet, said at least one percolating porous electrode being located in the vicinity of said inlet and said counter-electrode being located in the vicinity of said outlet.

* * * * *

UNITED STATES PATENT AND TRADEMARK OFFICE
CERTIFICATE OF CORRECTION

PATENT NO. : 4,330,387
DATED : May 18, 1982
INVENTOR(S) : Michel Astruc, et al

It is certified that error appears in the above—identified patent and that said Letters Patent is hereby corrected as shown below:

On the title page,

[73] Assignee: should read    --Societe Nationale Elf Aquitaine (Production)--

Column 1, line 12 : "conerns" should be --concerns--

Column 7, line 50 : "descreased" should be --decreased--

Column 11, line 27: "1.000" should be --1,000--

Signed and Sealed this

Twenty-sixth Day of July 1983.

[SEAL]

Attest:

GERALD J. MOSSINGHOFF

Attesting Officer    Commissioner of Patents and Trademarks